United States Patent [19]

Oseman

[11] Patent Number: 5,088,744
[45] Date of Patent: Feb. 18, 1992

[54] RESILIENT SEALING ELEMENT HAVING T-SHAPED CROSS SECTION

[75] Inventor: Gavin S. Oseman, Worcestershire, England

[73] Assignee: Dowty Seals Limited, Tewkesbury, England

[21] Appl. No.: 544,822

[22] Filed: Jun. 25, 1990

Related U.S. Application Data

[63] Continuation of Ser. No. 296,122, Jan. 12, 1989, abandoned.

[30] Foreign Application Priority Data

Jan. 21, 1988 [GB] United Kingdom ............... 8801359

[51] Int. Cl.$^5$ ........................... F16J 15/32; F16J 9/20; F16J 15/16
[52] U.S. Cl. .................. 277/188 R; 277/165; 277/177; 277/188 A
[58] Field of Search ............... 277/188 A, 165, 188 R, 277/177, 168

[56] References Cited

U.S. PATENT DOCUMENTS

| | | |
|---|---|---|
| 2,349,170 | 5/1944 | Jackman ............... 277/188 A |
| 2,765,204 | 10/1956 | Josephson ............. 277/188 A |
| 3,582,094 | 6/1971 | Whittaker ............. 277/188 R |
| 3,771,801 | 11/1973 | Burke . | |
| 4,059,280 | 11/1977 | Eastwood ............. 277/188 A |

FOREIGN PATENT DOCUMENTS

| | | |
|---|---|---|
| 0048707 | 3/1982 | European Pat. Off. . |
| 2497907 | 7/1982 | France . |
| 2604235 | 3/1988 | France . |

*Primary Examiner*—Allan N. Shoap
*Attorney, Agent, or Firm*—Young & Thompson

[57] ABSTRACT

A sealing assembly comprises a resilient sealing element (1), possibly substantially T-shaped in cross-section, with a horizontal top portion (2) and a vertical portion (3) depending from the top portion and possessing a rounded sealing lip (4) at an end remote from the top portion (2). The assembly also comprises supporting elements (5) of substantially non-resilient material positioned one on each side of the vertical portion (3) characterized in that the surface of the sealing lip (4) is less rounded than semi-circular when in a non-deflected condition. Opposed sides of the vertical portion (3) meet the surface of the sealing lip (4) at turning points (T, P), and the surface of the sealing lip between these turning points preferably lies within semi-ellipses whose minor radii (B) are from 30% to 80% of the major radii (A) extending between the turning points (T, P). Preferably, the surface of the sealing lip is symmetrical about the center line of the cross-section of the vertical portion, preferably being semi-elliptical.

5 Claims, 1 Drawing Sheet

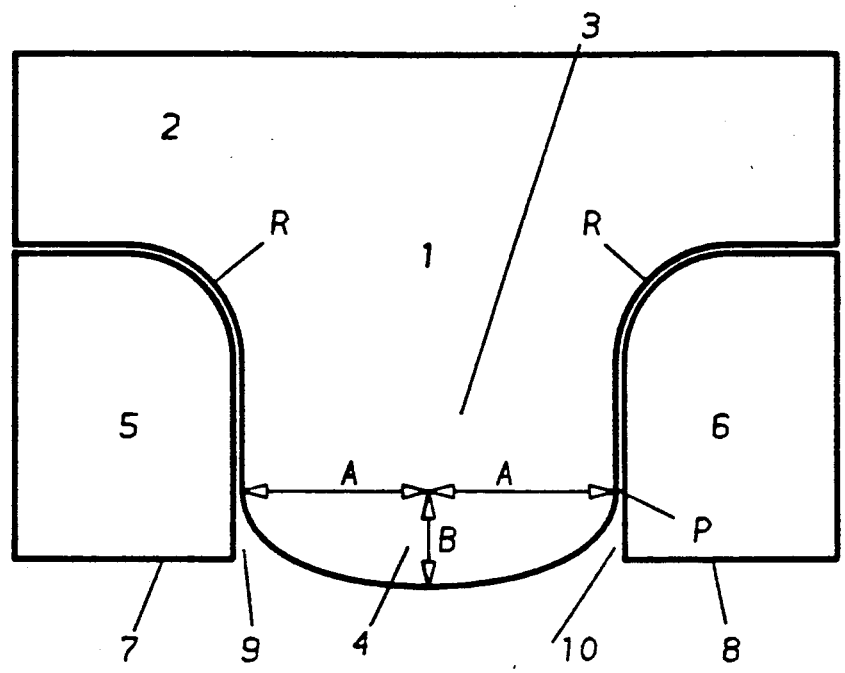
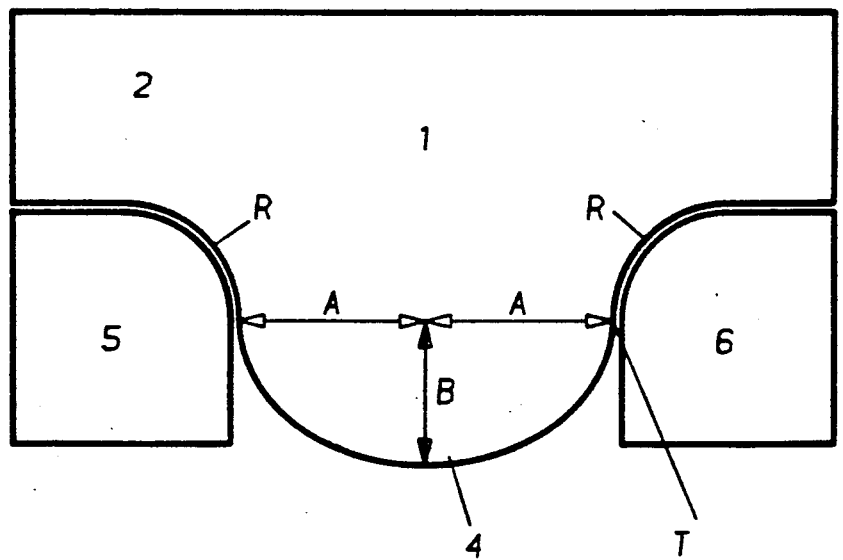

RESILIENT SEALING ELEMENT HAVING T-SHAPED CROSS SECTION

This application is a continuation of Ser. No. 296,122, filed Jan. 12, 1989, now abandoned.

TECHNICAL FIELD

This invention relates to seals and, more particularly, to sealing assemblies for use between two components which are movable relative to each other, especially reciprocating components such as pistons or rods contained within a housing.

Sealing assemblies are known which comprise, in cross-section, a generally 'T'-shaped element of elastomeric material and two supporting elements positioned on either side of the vertical portion of the 'T' and bounded by the "top" of the 'T' (i.e. the horizontal portion from which the vertical portion depends centrally) and being of non-resilient, i.e. in use non-extrudable, material.

Such an assembly is commonly circular in overall shape and operates by its placement in a groove in one of the components to be sealed with the remote end of the vertical portion of the 'T' protruding as a sealing lip and by the non-resilient material preventing, in use, its extrusion between the moving components. As such, these assemblies have generally been superior to conventional 'O'-rings and similar seals.

The known assemblies of this type have been provided with a sealing lip of semi-circular cross-section (measured in the free condition) so that the surface of the other component to be sealed is arranged tangentally relative to the sealing lip.

DISCLOSURE OF THE INVENTION

Although the known assemblies of this type have been employed widely, it has now been surprisingly found that their sealing characteristics can be improved by providing the sealing lip in particular with a different shape.

In accordance with the invention there is provided a sealing assembly which comprises a resilient sealing element having a horizontal top portion and a vertical portion depending from the top portion and possessing a rounded sealing lip at an end remote from the top portion, the assembly also comprising supporting elements of substantially non-resilient material positioned one on each side of the vertical portion, characterised in that the surface of the sealing lip is less rounded than semi-circular when in a non-deflected condition.

The cross-sectional shape of the sealing lip is advantageously symmetrical, for example 'T'-shaped.

In preferred assemblies the cross-section of the sealing lip, defined as beginning when the sides of the vertical portion of the sealing element cease to be parallel or when there is a turning point in the sides of the vertical portion, is any arcuate shape falling within an area defined by semi-ellipses whose minor radii are from 30% to 80% of the respective major radii. Within this area, any particular sealing lip is itself preferably elliptical but may alternatively be other arcuate shapes falling within the area.

In a typical assembly of overall circular configuration, the major radius is measured as half the axial width of the vertical portion of the sealing element at the point where the sides of the vertical portion cease to be parallel or at a turning point and the minor radius is measured (centrally in the case of a symmetrical lip) from the major radius to the remote end of the sealing lip. The attached drawings illustrate the measurement of the major and minor radii.

Most preferably the minor radius is less than 60% of the major radius and advantageously it is from 30% to 50% of the major radius.

Throughout this specification, the terms "horizontal portion" and "vertical portion" in relation to the sealing element are used for explanatory purposes only and will not normally accord with the position of these portions in use of the sealing assemblies.

In addition to the less than circular lip of the vertical portion of the sealing element, the junction between the vertical portion and the horizontal portion is preferably radiussed in order to maintain the integrity of the sealing element over a prolonged period of time.

It is when this radiussing is substantial that it may extend as far as the beginning of the sealing lip (as defined above); in such cases, the vertical portion does not possess parallel sides and there is simply a turning point between the radiussing and the lip, again referred to above.

Whatever are the dimensions of the sealing element, the complementary elements will generally be of corresponding shape so that they will closely fit the sealing element in the vicinity of the lower part of the horizontal portion and the upper part of the vertical portion in particular. However, they will generally not follow the arcuate shape of the sealing lip because, in use, the elastomeric lip is designed to be urged into the gaps formed between the lip and the respective complementary elements.

The sealing element may be made from any suitable elastomeric material such as neoprene or any natural or synthetic rubbers.

The complementary elements, on the other hand, must be made from substantially non-elastomeric substances such as PTFE, Nylon or any suitable plastic composition. Although not preferred, metallic supporting elements may be employed.

DESCRIPTION OF THE DRAWINGS

For a better understanding of the invention, reference is now made by way of exemplification only to the accompanying drawings in which:

FIG. 1 shows a cross-section through a sealing assembly of the invention, and

FIG. 2 shows a cross-section through a further sealing assembly of the invention.

BEST MODE OF CARRYING OUT THE INVENTION

With reference to FIG. 1, there is shown in cross-section a sealing assembly of the invention which comprises a substantially T-shaped element 1 having (in the view shown in this drawing) a horizontal top portion 2 from which depends perpendicularly and centrally a vertical portion 3. The element 1 as a whole is of circular shape with the vertical portion innermost (although in other embodiments it could be outermost) and is made from elastomeric material. At the end of the vertical portion 3 remote from the top portion 2 there is a sealing lip 4 which is substantially elliptical in shape.

There is radiussing R of the angle between the top portion and the vertical portion of the element 1 but the sides of the vertical portion 3 are parallel between this radiussing and the sealing lip 4, the lip being defined herein as beginning at the point P where the sides of portion 3 cease to be parallel. The major radius A is measured at the point P and the minor radius B measured centrally between major radii A and the end of the sealing lip 4 remote from the top portion 2. In this embodiment the minor radius B is 50% of the major radius A.

Supporting elements 5, 6 having a shape complementary to that of the T-shaped element 1 in the vicinity of the radiussing R and parallel sides of the element 1 in particular (but not in the vicinity of the sealing lip 4) are located on either side of the element 1. The supporting elements 5, 6 are made from a substantially non-elastomeric substance, in this case PTFE, and are not joined to the T-shaped element 1.

Prior to use, the assembly is placed in a groove (or whatever) in one of the two components to be sealed with the sealing lip 4 proud of the edges 7, 8 of the supporting elements 5, 6 respectively, i.e. as shown in FIG. 1. The measurement of the major and minor radii are measured in this state, i.e. in the free condition of the element 1. In actual use of the sealing assembly, the lip 4 will therefore engage with the other component and the lip 4 brought into line with the edges 7, 8. Relative movement between the respective components, and/or pressure energisation, will cause distortion of the lip and its displacement into the gaps 9, 10 formed between the sealing lip 4 and the supporting elements 5, 6. The surfaces 7, 8 remain in firm engagement with the other component and prevent extrusion of the elastomeric material of the lip 4 into any gap which might otherwise exist between the respective components.

The sealing assembly shown in FIG. 2 works on the same principle as that of FIG. 1. However, the vertical portion of the T-shaped element does not have parallel sides and the radiussing between the top portion and the vertical portion of the T-shaped element extends up to that part of the vertical portion defining the sealing lip. There is therefore a turning point T where the sealing lip begins and the major and minor radii are measured with reference to the point T. In this case the minor radius is 75% of the major radius.

I claim:

1. A sealing assembly which comprises a resilient sealing element having a T-shaped cross section having an axially extending portion and a radially extending portion that extends radially from the axially extending portion and has opposed sides and a rounded sealing lip at an end remote from the axially extending portion which meets said opposed sides at turning points, the assembly also comprising supporting elements of substantially non-resilient material positioned one adjacent each of said opposed sides of the radially extending portion, wherein the improvement comprises the surface of the rounded sealing lip between the turning points being substantially elliptical in form when the sealing element is undeformed, the surface of the sealing lip projecting radially from said turning points a distance 15 to 40% of the axial distance between said turning points when the sealing element is undeformed.

2. A sealing assembly as claimed in claim 1 in which the surface of the sealing lip projects radially from said turning points a distance of less than about 30% of the axial distance between said turning points.

3. A sealing assembly as claimed in claim 2 in which the sealing lip projects radially from said turning points a distance about 15 to 25% of the axial distance between said turning points.

4. A sealing assembly which comprises a resilient sealing element having a T-shaped cross section having an axially extending portion and a radially extending portion that extends radially from the axially extending portion and has opposed sides and a rounded sealing lip at an end remote from the axially extending portion which meets said opposed sides at turning points, the assembly also comprising supporting elements of substantially non-resilient material positioned one adjacent each of said opposed sides of the radially extending portion, wherein the improvement comprises the surface of the rounded sealing lip between the turning points lying within semi-ellipses, one of which projects radially from said turning points a distance 15% of the axial distance between said turning points, and the other of which projects radially from said turning points a distance 40% of the axial distance between said turning points when the sealing element is undeformed.

5. In a sealing assembly which comprises a resilient annular sealing element having an axis and having a T-shaped cross section having an axially extending portion and a radially extending portion that extends radially from the axially extending portion and has opposed sides and a convexly curved sealing lip whose convex curvature terminates in two parallel circular lines concentric to said axis and lying in planes perpendicular to said axis that contain all the tangents to said convexly rounded lip at said lines, the assembly also comprising annular supporting elements of substantially non-resilient material positioned one adjacent each of said opposed sides of the radially extending portion; the improvement wherein said convexly curved sealing lip extends radially beyond said lines a distance between 15 and 40% of the axial distance between said lines when the sealing element is undeformed.

* * * * *